(12) United States Patent  
Kuhlman et al.

(10) Patent No.: US 11,726,499 B2  
(45) Date of Patent: Aug. 15, 2023

(54) SYSTEMS AND METHODS FOR PROVIDING ALTITUDE REPORTING

(71) Applicant: GE Aviation Systems LLC, Grand Rapids, MI (US)

(72) Inventors: Michael Joseph Kuhlman, Malden, MA (US); Baljit Singh, Cambridge, MA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 270 days.

(21) Appl. No.: 17/064,031

(22) Filed: Oct. 6, 2020

(65) Prior Publication Data

US 2022/0107656 A1 Apr. 7, 2022

(51) Int. Cl.  
*G05D 1/06* (2006.01)  
*G06F 16/9035* (2019.01)  
(Continued)

(52) U.S. Cl.  
CPC ....... *G05D 1/0607* (2013.01); *G06F 16/9035* (2019.01); *G08G 5/0017* (2013.01); *G08G 5/04* (2013.01)

(58) Field of Classification Search  
CPC .......... G05D 1/0607; G06F 16/9035; G08G 5/0017; G08G 5/04; G08G 5/0013;  
(Continued)

(56) References Cited

U.S. PATENT DOCUMENTS 4,021,009 A * 5/1977 Baker ................. G05D 1/0607  
701/8  
8,494,760 B2 7/2013 Yoel et al.  
(Continued)

FOREIGN PATENT DOCUMENTS

EP 565399 B1 * 1/1997 ........... G01C 21/005  
EP 1466139 B1 * 2/2011 ........... G01C 21/005  
(Continued)

OTHER PUBLICATIONS

Extended European Search Report for EP Application No. 21199209.4 dated Feb. 16, 2022 (12 pages).  
(Continued)

*Primary Examiner* — Mary Cheung  
(74) *Attorney, Agent, or Firm* — Dinsmore & Shohl LLP (57) ABSTRACT

Disclosed herein are embodiments for providing altitude reporting. Some embodiments may include receiving a query from a first vehicle regarding altitude data of the first vehicle, providing the altitude data to the first vehicle, and receiving, by the computing device, a computed altitude from the first vehicle. Some embodiments include calculating an altitude uncertainty parameter for the first vehicle, determining a true altitude from the altitude data and the altitude uncertainty parameter, and determining whether the true altitude is within a predetermined threshold of a second altitude of a second vehicle. Some embodiments may be configured for, in response to determining that the true altitude is within the predetermined threshold, notifying at least one of the following: the first vehicle or the second vehicle.

20 Claims, 5 Drawing Sheets

(51) Int. Cl.
*G08G 5/00* (2006.01)
*G08G 5/04* (2006.01)

(58) Field of Classification Search
CPC .. G08G 5/0021; G08G 5/0026; G08G 5/0082; G08G 5/0086; G08G 5/045; G01C 21/20
See application file for complete search history.

(56) References Cited

U.S. PATENT DOCUMENTS

| | | | |
|---|---|---|---|
| 8,725,322 B2* | 5/2014 | Botargues | G05D 1/0688 701/16 |
| 9,922,282 B2 | 3/2018 | Weller et al. | |
| 10,082,803 B2 | 9/2018 | Ham et al. | |
| 10,279,906 B2 | 5/2019 | Levien et al. | |
| 10,494,093 B1 | 12/2019 | Miralles | |
| 2005/0007272 A1 | 1/2005 | Smith et al. | |
| 2006/0247828 A1* | 11/2006 | Ardila | G01C 5/005 701/14 |
| 2010/0090867 A1* | 4/2010 | Christophe | G01W 1/00 340/970 |
| 2015/0054664 A1* | 2/2015 | Dupont De Dinechin | G01C 23/00 340/973 |
| 2015/0094976 A1* | 4/2015 | Cooper | G01K 7/42 702/98 |
| 2016/0328983 A1 | 11/2016 | Hutchinson et al. | |
| 2017/0069214 A1 | 3/2017 | Dupray et al. | |
| 2017/0356757 A1* | 12/2017 | Bourret | G01S 19/48 |
| 2019/0011935 A1 | 1/2019 | Ham et al. | |
| 2019/0108760 A1* | 4/2019 | Krishna | G01C 5/06 |
| 2019/0317527 A1 | 10/2019 | Tan et al. | |
| 2020/0103228 A1* | 4/2020 | Ridenour | G01W 1/02 |

FOREIGN PATENT DOCUMENTS

| | | | |
|---|---|---|---|
| FR | 2749676 A1 * | 12/1997 | G01C 5/005 |
| JP | 2012177660 A * | 9/2012 | |

OTHER PUBLICATIONS

"Validation of Pressure Altitude using Geometric Altitude reported in surrounding traffic ADS-B ED—Darl Kuhn", IP.com, IP.com Inc., West Henrietta, NY, US, Mar. 11, 2019 (Mar. 11, 2019), XP013182542, ISSN: 1533-0001.

Ramasamy Subramanian et al: "A unified approach to separation assurance and collision avoidance for flight management systems", 2016 IEEE/AIAA 35TH Digital Avionics Systems Conference (DASC), IEEE, Sep. 25, 2016 (Sep. 25, 2016), pp. 1-8, XP033019230, DOI: 10.1109/DASC.2016.7777964.

* cited by examiner

SYSTEMS AND METHODS FOR PROVIDING ALTITUDE REPORTING

FIELD

The present disclosure relates to devices, systems, methods, and non-transitory computer-readable mediums for providing altitude reporting, and more specifically, for determining a baseline for altitude reporting and utilizing crowd-sourced data to determine a vehicle altitude.

BACKGROUND

Altitude of a UAS plays a very important role during flight. Some UAS manufacturers rely on GPS altitude, which can be very inaccurate. Others rely on pressure-based altitude, which is relative only to that vehicle. Hence, it is difficult to communicate the absolute altitude of a vehicle externally. Large uncertainty in altitude across vehicles could lead to vehicle collisions, near-collision incidents, and other flight conflicts and safety issues. At the very least, it forces large vertical clearances between vehicles, which leads to inefficient use of the airspace. As such, a need for accurate altitude reporting exists in the industry.

SUMMARY

Disclosed herein are embodiments for providing altitude reporting. Some embodiments may include receiving a query from a first vehicle regarding altitude data of the first vehicle, providing the altitude data to the first vehicle, and receiving, by the computing device, a computed altitude from the first vehicle. Some embodiments include calculating an altitude uncertainty parameter for the first vehicle, determining a true altitude from the altitude data and the altitude uncertainty parameter, and determining whether the true altitude is within a predetermined threshold of a second altitude of a second vehicle. Some embodiments may be configured for, in response to determining that the true altitude is within the predetermined threshold, notifying at least one of the following: the first vehicle or the second vehicle.

In an embodiment, a system includes a computing device that includes a processor and a memory component, the memory component storing logic that, when executed by the processor causes the system to receive altitude data that includes computed altitude from a first vehicle, crowdsource data to determine an altitude uncertainty parameter for the first vehicle, and determine a true altitude from the altitude data and the altitude uncertainty parameter. In some embodiments, the logic causes the system to determine whether the true altitude is within a predetermined threshold of a second altitude of a second vehicle and in response to determining that the true altitude is within the predetermined threshold, notify at least one of the following: the first vehicle or the second vehicle.

In an embodiment, a non-transitory computer-readable medium includes logic for execution by a computing device, the logic configured to cause the computing device to receive altitude data that includes a first computed altitude from a first vehicle, receive a second computed altitude from a second vehicle, and crowdsource data to determine a first altitude uncertainty parameter for the first vehicle and a second altitude uncertainty parameter for the second vehicle. In some embodiments the logic causes the computing device to determine a true altitude difference between the first vehicle and the second vehicle, wherein the true altitude difference is derived from the altitude data, the second computed altitude, the first altitude uncertainty parameter and the second altitude uncertainty parameter, determine whether the true altitude difference is within a predetermined threshold of a second altitude of the second vehicle, and in response to determining that the true altitude difference is within the predetermined threshold, notify at least one of the following: the first vehicle or the second vehicle.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

The present disclosure generally relates to devices, systems, and methods for providing altitude reporting. Specifically, the devices, systems, and methods described herein may establish a dynamic geospatial vertical datum. These embodiments combine hyperlocal weather, satellite data (e.g., global positioning, global navigation satellite system (GLONASS), etc.), and sensory data from multiple unmanned aerial systems (UAS) to establish a common vertical datum. As a fused model, these embodiments decrease the uncertainty of a pure satellite altitude, while increasing the globalization of pure pressure-based altitude.

In these embodiments, datum may be dynamically established by combining multiple sources and sensors types. The data may be crowdsourced from active UAS, hyperlocal weather providers, and/or any sensors on the ground stations. These embodiments attempt to simultaneously establish a dynamic localization and global mapping (similar to other simultaneous localization and mapping (SLAM) techniques) of the vertical datum. Unlike some other techniques, these embodiments utilize off the shelf sensors, making it easy to adopt for UAS operators.

In some embodiments, the workflow may include reporting out sensor outputs as a vehicle, such as a UAS, traverses its path. These sensor outputs may include satellite (GPS, GLONASS, etc.) position, pressure, temperature, etc. However, the vehicle may also include other sensors, such as radar altimeter, depth sensor, camera, microphone, accelerometer, etc. A combination of these sensors can also help establish an estimate of the vehicle altitude, which is also reported. Additionally, a remote computing device, which may include a ground station, UAS traffic management (UTM) system, and/or other remote computing device may receive the data from the UAS either directly or through a proxy.

In some embodiments, the remote computing device collects the data from one or more active vehicles in the vicinity. The remote computing device may also fetch the hyperlocal weather from other data providers. Using statistical techniques, the remote computing device may be configured to solve a global system of equations that reduces the total error and uncertainty in the vehicle altitudes and/or true altitude range. Additionally, the remote computing device may broadcast the resolved model and model parameters. Each vehicle can use these models to calculate its true altitude or true altitude range. In some embodiments, the vehicle may request its true altitude or true altitude range from the UTM. These embodiments enable consistent altitude reporting between vehicles of different manufactures to alert a user when vertical separation requirements are not met.

Figure 1:
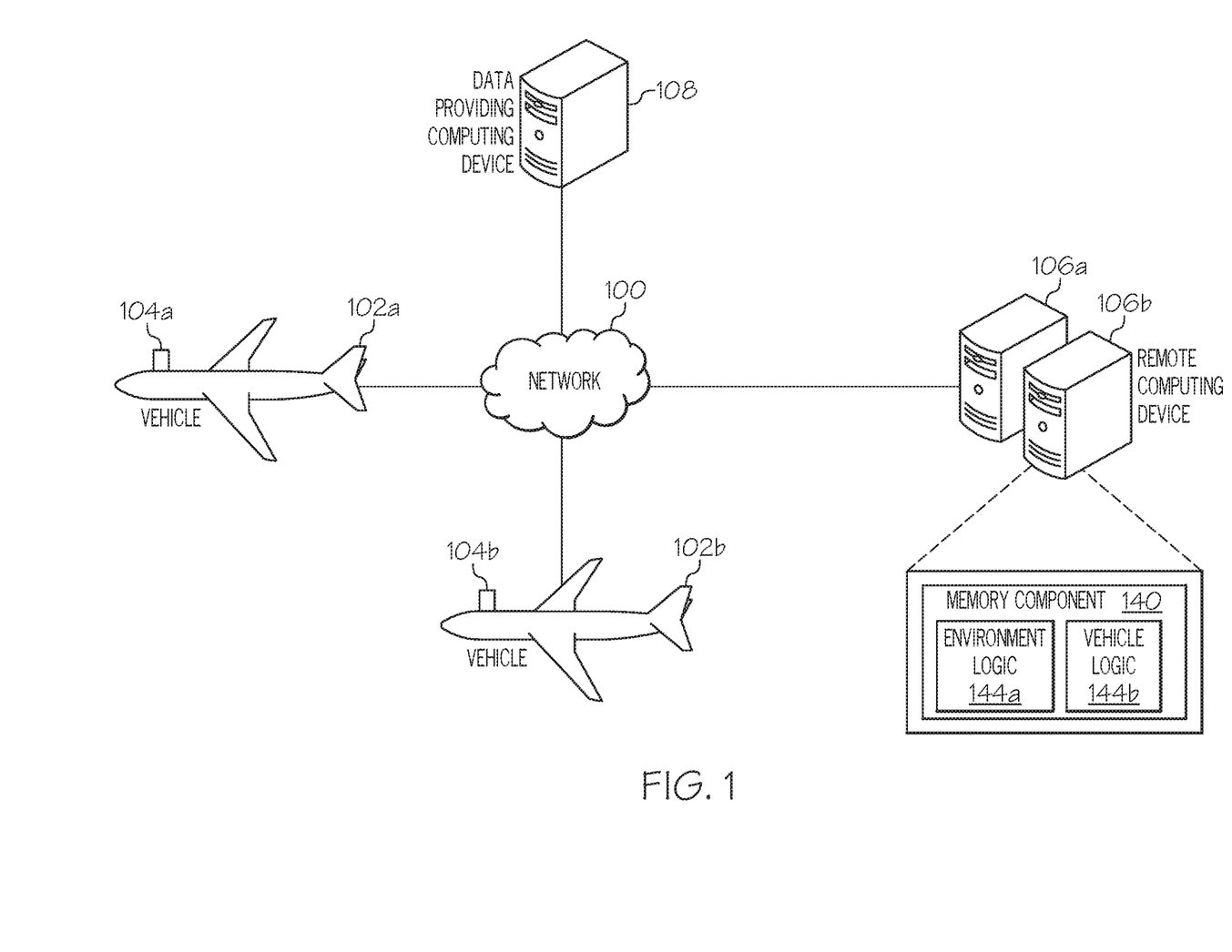
FIG. 1 schematically depicts a network environment for providing altitude reporting, according to one or more embodiments shown and described herein.

Referring now to the drawings, FIG. 1 schematically depicts a network environment for providing altitude reporting, according to one or more embodiments shown and described herein. As illustrated, the network environment may include a network 100, such as the internet, public switched telephone network, mobile telephone network, mobile data network, local network (wired or wireless), peer-to-peer connection, and/or other network for providing the functionality described herein.

Coupled to the network 100 are a first vehicle 102a, a second vehicle 102b (collectively referred to as "vehicles 102") with first sensor 104a and second sensor 104b, respectively (collectively referred to as "sensors 104"), a first remote computing device 106a, a second remote computing device 106b (collectively referred to as "remote computing devices 106"), and a data providing computing device 108. The vehicles 102 may be configured as any aerial vehicle, such as an unmanned aerial system (UAS), a small UAS (sUAS), an airplane, helicopter, drone, etc. The vehicles 102 may each be configured with one or more sensors, such as a temperature sensor, an altitude sensor, a data sensor, an antenna, a transceiver, a radar altimeter, a depth sensor, a camera, a microphone, an accelerometer, etc. that can detect altitude, position, pressure, temperature, satellite data, communications from the remote computing devices 106 and/or the data providing computing device 108, and/or perform other actions.

Also coupled to network 100 are the remote computing devices 106. The remote computing devices 106 represent one or more different computing devices for providing the functionality provided herein and, as such, may be configured as a server, a personal computer, tablet, database, mobile device, and/or other computing device. Specific examples include the UTM system, a USS system, a ground control station, a mapping system, a third-party computing device, a system for providing conformance volume based airspace access, and/or other computing device. The remote computing devices 106 may include a memory component 140, which may store environment logic 144a and vehicle logic 144b. The environment logic 144a may be configured to cause the remote computing device 106 to determine and/or communicate data related to the environment, such as weather, traffic congestion, vehicle altitude, etc. Similarly, the vehicle logic 144b may be configured to cause one or more of the remote computing devices 106 to determine data related to the first vehicle 102a and/or second vehicle 102b, as described in more detail below.

Also coupled to the network 100 is the data providing computing device 108. The data providing computing device 108 may represent one or more computing device that is operated by a third party to provide data to the vehicles 102 and/or the remote computing devices 106. As will be understood, the data providing computing device 108 may include hardware and/or software, similar to that described in reference to the remote computing devices 106. In some embodiments the data providing computing device 108 may provide hyperlocal weather, terrain data, satellite data (e.g., global positioning, global navigation satellite system (GLONASS), etc.)

Figure 2:
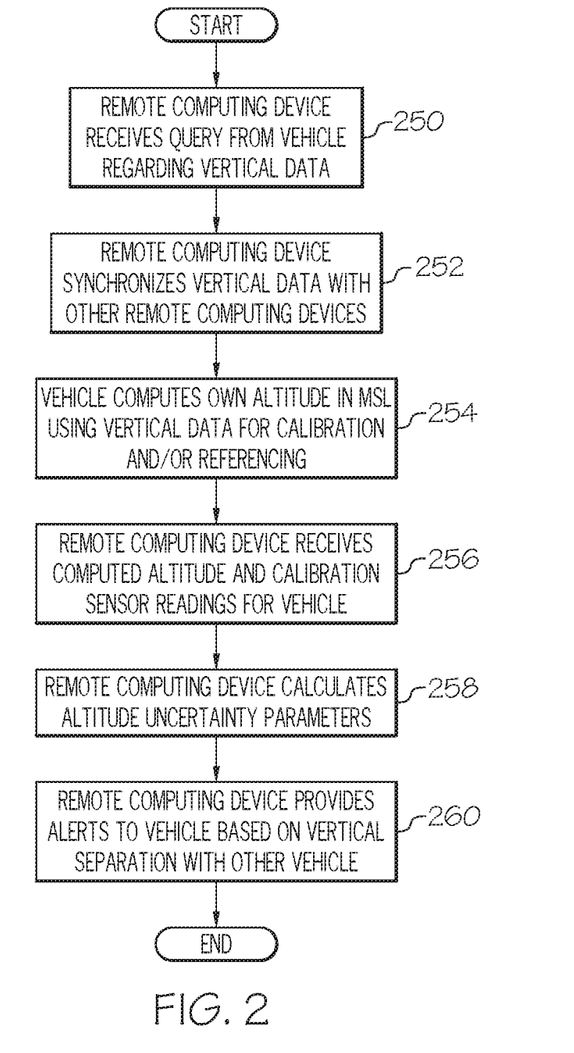
FIG. 2 depicts a flowchart for providing an alert to a vehicle, based on vertical separation with other vehicles, according to one or more embodiments shown and described herein.

FIG. 2 depicts a flowchart for providing an alert to a vehicle (such as first vehicle 102a), based on vertical separation with other vehicles, according to one or more embodiments shown and described herein. As illustrated in block 250, a remote computing device 106b, such as a USS, UTM, or other computing device may receive a query from a vehicle (such as the first vehicle 102a) regarding vertical data. The query may include data related to the altitude of the first vehicle 102a and/or second vehicle 102b. In block 252, the remote computing device 106b synchronizes vertical data with other remote computing devices (such as remote computing device 106a). This may include comparing data received from vehicles 102 that the particular remote computing devices 106 monitor and finding a baseline for normalizing that data. The remote computing device 106 may send the requested data to the first vehicle 102a.

In block 254, the first vehicle 102a computes its own altitude in mean sea level (MSL) using vertical data received from the remote computing device 106b for calibration and/or referencing. In block 256, the remote computing device 106b receives the computed altitude and calibration sensor readings from the first vehicle 102a. Optionally, the remote computing device stores and computes calibration sensor readings for the vehicle. In block 258, the remote computing device 106b calculates the altitude uncertainty parameter of the first vehicle 102a (e.g., first altitude uncertainty parameter) and/or the altitude uncertainty parameter of the second vehicle 102b (e.g., second altitude uncertainty parameter). The altitude uncertainty parameter may include a measurement covariance. As an example, the environmental parameter may substantially equal uncertainty in measured sea level pressure, and vehicle parameter may substantially equal sensor measurement error. In block 260, the remote computing device 106b provides an alert to the vehicle 102a, based on vertical separation with other vehicles 102b meeting a predetermined threshold distance.

Figure 3:
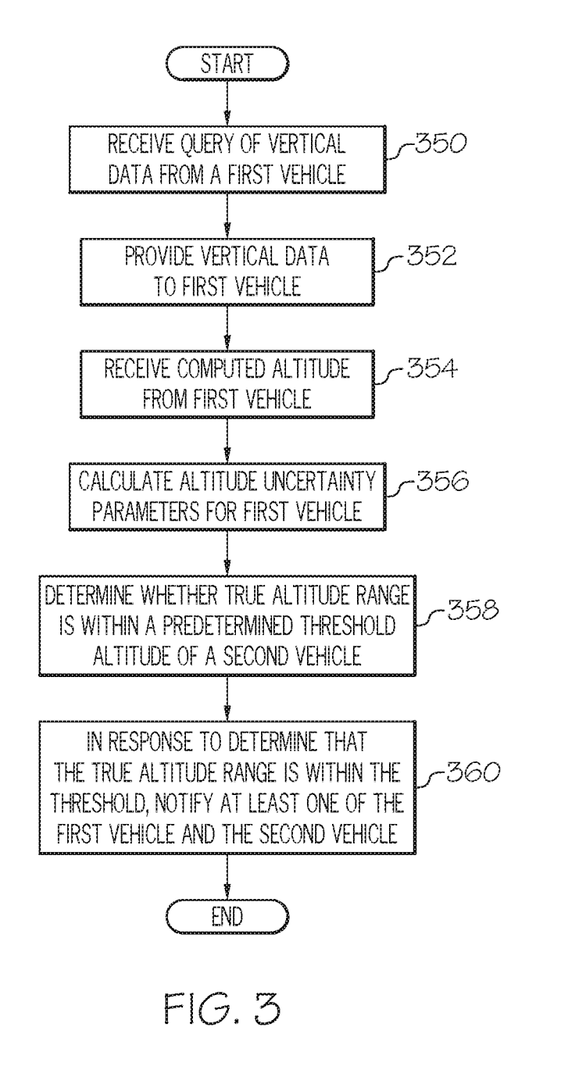
FIG. 3 depicts a flowchart for providing an alert to a vehicle, based on vertical separation with other vehicles, according to one or more embodiments shown and described herein.

FIG. 3 depicts a flowchart for providing an alert to a vehicle (such as the first vehicle 102a), based on vertical separation with another vehicle (such as the second vehicle 102b), according to one or more embodiments shown and described herein. As illustrated in block 350, a query of altitude data may be received from a first vehicle 102a (which may include a first altitude). Altitude data from the second vehicle 102b may include a second altitude, a temperature, radar altimeter data, depth data, imagery, sound, accelerometer data, and/or other data and may be received from one or more of the sensors 104. In block 352, first vertical data may be provided to the first vehicle 102a. In block 354, a computed altitude may be received from the first vehicle 102a (e.g., first computed altitude) and/or a computed altitude may be received from the second vehicle 102b (e.g., second computed altitude). In block 356, one or more altitude uncertainty parameters for the first vehicle 102a (e.g., first altitude uncertainty parameter) and/or second vehicle 102b (e.g., second altitude uncertainty parameter) may be calculated.

Depending on the particular embodiment, the altitude uncertainty parameter may include an environmental parameter and/or a vehicle parameter. From the altitude uncertainty parameter, a true altitude range may be determined by the remote computing device 106b. As discussed herein, the one or more uncertainty parameters may be related to the vehicle and/or environmental factors. The true altitude range may be a range of altitudes that the first vehicle 102a may actually have, based on the altitude uncertainty parameter. In block 358, a determination may be made regarding whether the computed altitude of the first vehicle 102a with the altitude uncertainty parameters is within a predetermined threshold of a second vehicle 102b. In block 360, in response to determining that the computing altitude is within the threshold, at least one of the first vehicle 102a or the second vehicle 102b may be notified. Some embodiments may be configured for providing an instruction to at least one of the following: the first vehicle or the second vehicle to fly to a different altitude or to change course. In some embodiments, such information regarding vehicle altitude could be provided as inputs to a collision avoidance system. These inputs may include relative or absolute height, with the collision avoidance system being configured to determine relative differences accordingly. Some embodiments are configured for using global equations for reducing error of the true altitude, as described above.

As will be understood, some embodiments may be configured to calculate a true altitude difference. Some of these embodiments may be configured to calculate a first true altitude and a second true altitude and then calculate the true altitude difference between the two. These embodiments may be configured to not calculate an objective altitude for the first vehicle 102a and second vehicle 102b, but merely a relative altitude difference.

Figure 4:
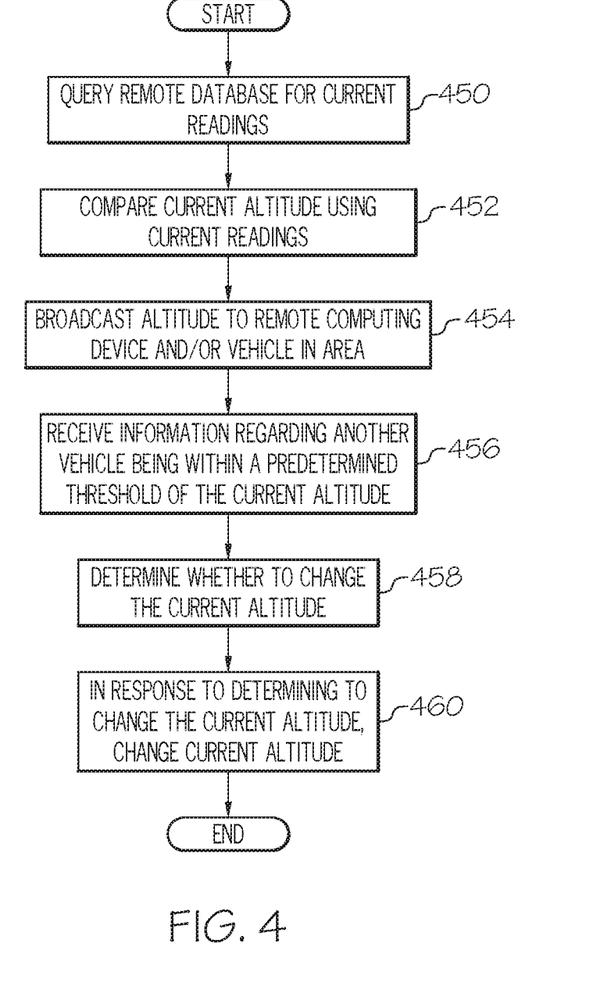
FIG. 4 depicts a flowchart for changing an altitude of a vehicle, based on the presence of other vehicles, according to one or more embodiments shown and described herein.

FIG. 4 depicts a flowchart for changing an altitude of a vehicle (such as the first vehicle 102a), based on the presence of another vehicle (such as the second vehicle 102b), according to one or more embodiments shown and described herein. As illustrated in block 450, a remote database may be queried for current readings, such as pressure readings, altitude data, and/or other readings. In block 452, a current altitude using current readings may be compared to determine the accuracy of the current altitude. In block 454, the altitude of the first vehicle 102a may be broadcast to another vehicle (such as the second vehicle 102b) and/or to the remote computing device 106b. In block 456, information regarding whether another vehicle (e.g., the second vehicle 102b) is within a predetermined threshold distance of the current altitude of the first vehicle 102a is received. In block 458, the first vehicle 102a may determine whether to change the current altitude. In block 460, in response to determining to change the current altitude, the first vehicle 102a may change its current altitude. As discussed above, some embodiments may utilize information regarding vehicle altitude as inputs to a collision avoidance system. These inputs may include relative or absolute height, with the collision avoidance system being configured to determine relative differences accordingly.

Figure 5:
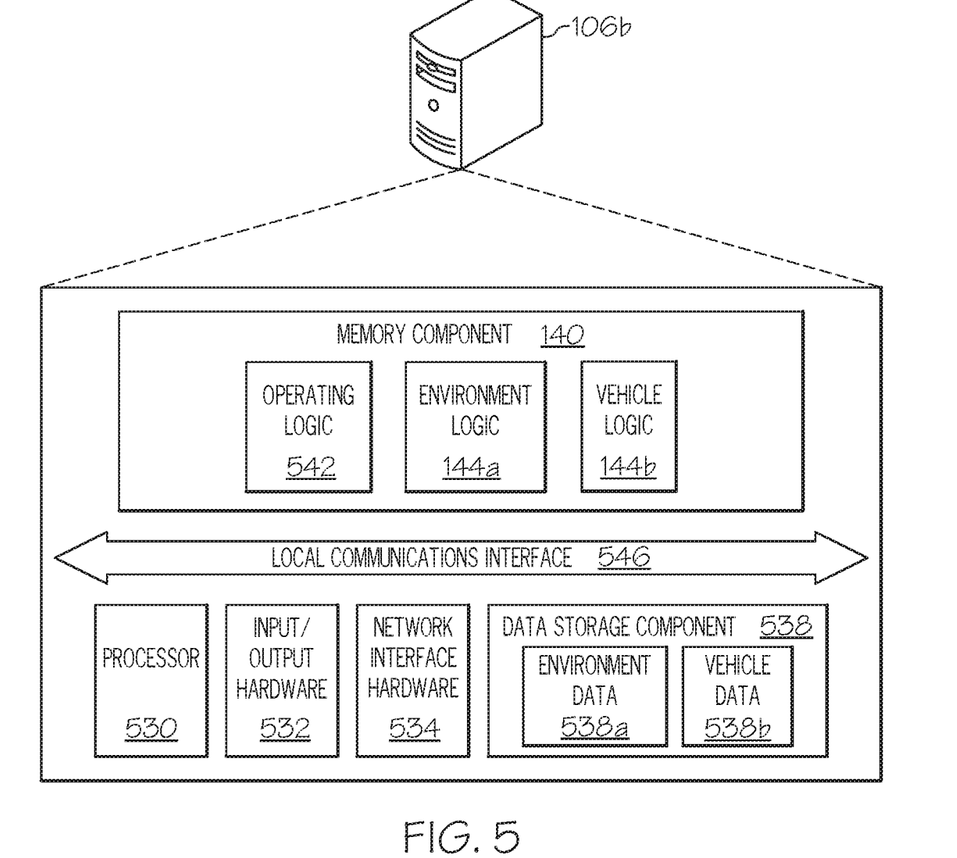
FIG. 5 depicts a remote computing device that may be utilized for providing altitude reporting, according to embodiments described herein.

FIG. 5 depicts a remote computing device 106b that may be utilized for providing altitude reporting, according to embodiments described herein. As illustrated, the remote computing device 106b includes a processor 530, input/output hardware 532, network interface hardware 534, a data storage component 536 (which stores environment data 538a, vehicle data 538b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 106b and/or external to the remote computing device 106b.

The memory component 140 may store operating system logic 542, the environment logic 144a, and the vehicle logic 144b. The environment logic 144a and the vehicle logic 144b may each include a plurality of different pieces of logic, each of which may be embodied as a computer program or module, firmware, and/or hardware, as an example. A local interface 546 is also included in FIG. 5 and may be implemented as a bus or other communication interface to facilitate communication among the components of the remote computing device 106b.

The processor 530 may include any processing component operable to receive and execute instructions (such as from a data storage component 536 and/or the memory component 140). As described above, the input/output hardware 532 may include and/or be configured to interface with the components of FIG. 5.

The network interface hardware 534 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 106b and other computing devices, such as those depicted in FIG. 1.

The operating system logic 542 may include an operating system and/or other software for managing components of the remote computing device 106b. As discussed above, the environment logic 144a may reside in the memory component 140 and may be configured to cause the processor 530 to determine environment data for calculating altitude uncertainty parameters, as described above. Similarly, the vehicle logic 144b may be utilized to determine data related to the vehicles 102 for calculating the altitude uncertainty parameters, and/or provide other similar functionality.

As an example, the altitude uncertainty parameters may represent inaccuracies in a calculated altitude for the first vehicle 102a. The inaccuracies may result from environmental conditions, such as a change in barometric pressure, data from other vehicles, data from other data providers, and/or other environmental conditions. The environment logic 144a may be configured to accumulate these inaccuracies for calculating an uncertainty parameter. Similarly, the inaccuracies may be in the form of an inaccurate barometer, an inaccurate positioning system, instability in the operation of the vehicle, etc. The vehicle logic 144b may be configured to determine these inaccuracies from vehicle data. Depending on the particular embodiment, the environment logic 144a, the vehicle logic 144b, and/or other component may utilize the inaccuracies in environmental data and vehicle data to determine an overall altitude uncertainty parameter.

It should be understood that while the components in FIG. 5 are illustrated as residing within the remote computing device 106b, this is merely an example. In some embodiments, one or more of the components may reside external to the remote computing device 106b. It should also be understood that, while the remote computing device 106b is illustrated as a single device, this is also merely an example. In some embodiments, the environment logic 144a and the vehicle logic 144b may reside on different computing devices. As another example, one or more of the functionalities and/or components described herein may be provided by a remote computing device 106b, the data providing computing device 108, and/or other devices, which may be coupled to the remote computing device 106b via a network connection (wired or wireless). These devices may also include hardware and/or software for performing the functionality described herein.

Additionally, while the remote computing device 106b is illustrated with the environment logic 144a and the vehicle logic 144b as separate logical components, this is also an example. In some embodiments, a single piece of logic may cause the hub to provide the described functionality.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

A method for providing altitude reporting, comprising: receiving, by a computing device, a query from a first vehicle regarding altitude data of the first vehicle; providing, by the computing device, the altitude data to the first vehicle; receiving, by the computing device, a computed altitude from the first vehicle; calculating, by the computing device, an altitude uncertainty parameter for the first vehicle; determining, by the computing device, a true altitude from the altitude data and the altitude uncertainty parameter; determining, by the computing device, whether the true altitude is within a predetermined threshold of a second altitude of a second vehicle; and in response to determining that the true altitude is within the predetermined threshold, notifying at least one of the following: the first vehicle or the second vehicle.

The method of any preceding clause, wherein the altitude uncertainty parameter includes at least one of the following: an environmental parameter or a vehicle parameter.

The method of any preceding clause, wherein the altitude data includes at least one of the following: a temperature, an altitude, radar altimeter data, depth data, imagery, sound, or accelerometer data.

The method of any preceding clause, wherein the altitude data includes data received from at least one of the following: the second vehicle, a remote computing device, or a data providing computing device.

The method of any preceding clause, wherein notifying includes providing an instruction to at least one of the following: the first vehicle or the second vehicle to fly to a different altitude.

The method of any preceding clause, further comprising reducing error of the true altitude.

The method of any preceding clause, wherein the true altitude includes a true altitude range.

The method of any preceding clause, further comprising determining a correction to the true altitude and communicating the correction to at least one of the following: the second vehicle or a collision avoidance system.

A system for providing altitude reporting, comprising: a remote computing device that includes a processor and a memory component, the memory component storing logic that, when executed by the processor causes the system to perform at least the following: receive altitude data that includes computed altitude from a first vehicle; crowdsource data to determine an altitude uncertainty parameter for the first vehicle; determine a true altitude from the altitude data and the altitude uncertainty parameter; determine whether the true altitude is within a predetermined threshold of a second altitude of a second vehicle; and in response to determining that the true altitude is within the predetermined threshold, notify at least one of the following: the first vehicle or the second vehicle.

The system of any preceding clause, wherein the altitude uncertainty parameter includes at least one of the following: an environmental parameter or a vehicle parameter.

The system of any preceding clause, wherein the altitude data includes at least one of the following: a temperature, an altitude, radar altimeter data, depth data, imagery, sound, or accelerometer data.

The system of any preceding clause, wherein the computed altitude includes at least one of the following: a temperature, an altitude, radar altimeter data, depth data, imagery, sound, or accelerometer data.

The system of any preceding clause, further comprising the first vehicle, wherein the first vehicle includes a sensor, wherein the sensor includes at least one of the following for determining the computed altitude: a temperature sensor, an altitude sensor, a data sensor, an antenna, a transceiver, a radar altimeter, a depth sensor, a camera, or a microphone, an accelerometer.

The system of any preceding clause, wherein notifying includes providing an instruction to at least one of the following: the first vehicle or the second vehicle to fly to a different altitude.

The system of any preceding clause, wherein the true altitude includes a true altitude range.

A non-transitory computer-readable medium for providing conformance volume based airspace access, the non-transitory computer-readable medium including logic for execution by a computing device, the logic configured to cause the computing device to perform at least the following: receive altitude data that includes a first computed altitude from a first vehicle; receive a second computed altitude from a second vehicle; crowdsource data to determine a first altitude uncertainty parameter for the first vehicle and a second altitude uncertainty parameter for the second vehicle; determine a true altitude difference between the first vehicle and the second vehicle, wherein the true altitude difference is derived from the altitude data, the second computed altitude, the first altitude uncertainty parameter and the second altitude uncertainty parameter; determine whether the true altitude difference is within a predetermined threshold of a second altitude of the second vehicle; and in response to determining that the true altitude difference is within the predetermined threshold, notify at least one of the following: the first vehicle or the second vehicle.

The non-transitory computer-readable medium of any preceding clause, wherein the wherein the first altitude uncertainty parameter includes at least one of the following: an environmental parameter or a vehicle parameter.

The non-transitory computer-readable medium of any preceding clause wherein the altitude data includes at least one of the following: a temperature, an altitude, radar altimeter data, depth data, imagery, sound, or accelerometer data.

The non-transitory computer-readable medium of any preceding clause wherein notifying includes providing an instruction to at least one of the following: the first vehicle or the second vehicle to fly to a different altitude.

The non-transitory computer-readable medium of any preceding clause wherein the logic further causes the computing device to reduce error of the true altitude difference.

What is claimed is:

1. A method for providing altitude reporting, comprising:
receiving, by a computing device that is remote from a first vehicle and a second vehicle, a query from the first vehicle regarding first altitude data of the first vehicle;
providing, by the computing device, the first altitude data to the first vehicle;
receiving, by the computing device, a computed altitude from the first vehicle;
calculating, by the computing device, a first altitude uncertainty parameter for the first vehicle;
determining, by the computing device, a first true altitude from the first altitude data and the first altitude uncertainty parameter;
determining, by the computing device, a second true altitude of the second vehicle from second altitude data and a second altitude uncertainty parameter associated with the second vehicle;
determining, by the computing device, whether the first true altitude is within a predetermined threshold of the second true altitude of the second vehicle; and
in response to determining that the first true altitude is within the predetermined threshold, notifying at least one of the following: the first vehicle or the second vehicle.

2. The method of claim 1, wherein the first altitude uncertainty parameter includes at least one of the following: an environmental parameter or a vehicle parameter.

3. The method of claim 1, wherein the first altitude data includes at least one of the following: a temperature, an altitude, radar altimeter data, depth data, imagery, sound, or accelerometer data.

4. The method of claim 1, wherein the first altitude data includes data received from at least one of the following: the second vehicle, a remote computing device, or a data providing computing device.

5. The method of claim 1, wherein notifying includes providing an instruction to at least one of the following: the first vehicle or the second vehicle to fly to a different altitude.

6. The method of claim 1, further comprising reducing error of the first true altitude.

7. The method of claim 1, wherein the first true altitude includes a true altitude range.

8. The method of claim 1, further comprising determining a correction to the first true altitude and communicating the correction to at least one of the following: the second vehicle or a collision avoidance system.

9. A system for providing altitude reporting, comprising:
a remote computing device that is remote from a first vehicle and a second vehicle, the remote computing device including a processor and a memory component, the memory component storing logic that, when executed by the processor causes the system to perform at least the following:
receive a query from the first vehicle regarding first altitude data of the first vehicle;
receive a computed altitude from the first vehicle;
crowdsource data to determine a first altitude uncertainty parameter for the first vehicle;
determine a first true altitude from the first altitude data and the first altitude uncertainty parameter;
determine a second true altitude of the second vehicle from second altitude data and a second altitude uncertainty parameter associated with the second vehicle;
determine whether the first true altitude is within a predetermined threshold of the second true altitude; and
in response to determining that the first true altitude is within the predetermined threshold, notify at least one of the following: the first vehicle or the second vehicle.

10. The system of claim 9, wherein the first altitude uncertainty parameter includes at least one of the following: an environmental parameter or a vehicle parameter.

11. The system of claim 9, wherein the first altitude data includes at least one of the following: a temperature, an altitude, radar altimeter data, depth data, imagery, sound, or accelerometer data.

12. The system of claim 9, wherein the computed altitude includes at least one of the following: a temperature, an altitude, radar altimeter data, depth data, imagery, sound, or accelerometer data.

13. The system of claim 9, further comprising the first vehicle, wherein the first vehicle includes a sensor, wherein the sensor includes at least one of the following for determining the computed altitude: a temperature sensor, an altitude sensor, a data sensor, an antenna, a transceiver, a radar altimeter, a depth sensor, a camera, or a microphone, an accelerometer.

14. The system of claim 9, wherein notifying includes providing an instruction to at least one of the following: the first vehicle or the second vehicle to fly to a different altitude.

15. The system of claim 9, wherein the first true altitude includes a true altitude range.

16. A non-transitory computer-readable medium for providing conformance volume based airspace access, the non-transitory computer-readable medium including logic for execution by a computing device that is located remote from a first vehicle and a second vehicle, the logic configured to cause the computing device to perform at least the following:
receive a query from the first vehicle regarding first altitude data of the first vehicle;
receive a first computed altitude from a first vehicle;

receive a second computed altitude from a second vehicle;

crowdsource data to determine a first altitude uncertainty parameter for the first vehicle and a second altitude uncertainty parameter for the second vehicle;

determine a first true altitude for the first vehicle, based on the first altitude uncertainty parameter and the first altitude data;

determine a second true altitude for the second vehicle, based on the second altitude uncertainty parameter and second altitude data associated with the second vehicle;

determine a true altitude difference between the first vehicle and the second vehicle, wherein the true altitude difference is derived from the altitude data, the second computed altitude, the first altitude uncertainty parameter and the second altitude uncertainty parameter;

determine whether the true altitude difference is within a predetermined threshold of a second altitude of the second vehicle; and in response to determining that the true altitude difference is within the predetermined threshold, notify at least one of the following: the first vehicle or the second vehicle.

17. The non-transitory computer-readable medium of claim 16, wherein the first altitude uncertainty parameter includes at least one of the following: an environmental parameter or a vehicle parameter.

18. The non-transitory computer-readable medium of claim 16, wherein the first altitude data includes at least one of the following: a temperature, an altitude, radar altimeter data, depth data, imagery, sound, or accelerometer data.

19. The non-transitory computer-readable medium of claim 16, wherein notifying includes providing an instruction to at least one of the following: the first vehicle or the second vehicle to fly to a different altitude.

20. The non-transitory computer-readable medium of claim 16, wherein the logic further causes the computing device to reduce error of the true altitude difference.

* * * * *